Jan. 12, 1937. T. F. PETERSON Re. 20,244

HIGH TENSION CABLE

Original Filed Nov. 10, 1925

Inventor

Thomas F. Peterson

By Edward E. Clement

Attorney

Reissued Jan. 12, 1937

Re. 20,244

UNITED STATES PATENT OFFICE 20,244

HIGH TENSION CABLE

Thomas F. Peterson, Worcester, Mass.

Original No. 1,912,794, dated June 6, 1933, Serial No. 68,089, November 10, 1925. Application for reissue May 21, 1935, Serial No. 22,575

9 Claims. (Cl. 173—265)

My invention relates to high voltage cable for electrical power transmission, and has for its objects, among others, the following:

(1) To produce a cable which may be used for transmission at voltages considerably higher than those used at present; (2) to increase the allowable current density in copper; (3) to decrease the dielectric losses; and (4) to make the dielectric renewable. I attain my objects in the manner and by means of the apparatus and methods hereinafter set forth:

Very briefly stated, this cable comprises as its essential features a single conductor with an enclosed fluid dielectric, preferably compressed air, and the cable may be assembled, so to speak, when it is installed. More specifically stated, the cable in one form may consist of an envelope, such as a tube or pipe of metal, lead, or the like, preferably flexible tubing, in the axis of which a round copper conductor or core is held by means of hard rubber or equivalent molded spacer, the space between the tube and the conductor being filled with a fluid dielectric such as compressed air or oil. The material to be used for the outer casing or envelope will depend on subway conditions, e. g., for new installations of subway, iron pipe, brass or the like would be indicated, but on the other hand for existing subways, lead pipe, reinforced with steel tape, would be preferable for pulling into ducts, (the difficulty of such pulling in being taken into consideration). In so pulling in, or in installing in new subway, the external tube or casing is first put in, then the copper conductor is drawn in, and spacers are attached thereto during the process. These spacers are preferably made in two halves of a design which will prevent break-down of the insulation and eliminate surface leakage troubles. They are placed on the copper conductor during the pulling in operation, at intervals depending on the configuration of the line, that is to say, whether the duct is straight or curved and to what degree.

My invention is illustrated in the accompanying drawing, in which.

In my design, the important features are:—

(1) Approximately a 3–1 ratio of diameters—pipe to conductor; (2) a spacer, either individual or continuous, of such shape as to make any path of electric flux have but a small fraction of its length in solid dielectric of the spacer. (The fluid dielectric is at all points the essential and major insulation.) Usually in insulator design it is considered necessary to have the surfaces of dielectrics coincident with the electric flux. Divergence from this rule is allowable when solid substance is of such proportions as not to cause too material a lowering of the break-down of other insulating substance such as compressed gas. In addition, the slope of the spacer at various distances from the center, as will be described may be made such as to have flashover along its surface occur at a higher voltage than across the fluid itself. Since there may be some corona at points along the conductor, with accompanying formation of ozone, which is injurious to most materials, it is to be understood that $CO_2$ may be used as a substitute for compressed air. The main points to be kept in mind are: That compressed gases have their dielectric strength increased practically in direct proportion to the increase in pressure, and my device, now to be described, constitutes a means of applying this principle to high tension cables in order to increase working voltages, reduce dielectric loss, eliminate aging characteristics of different cables, increase the current carrying capacity, and to make the dielectric renewable.

Figure 1:
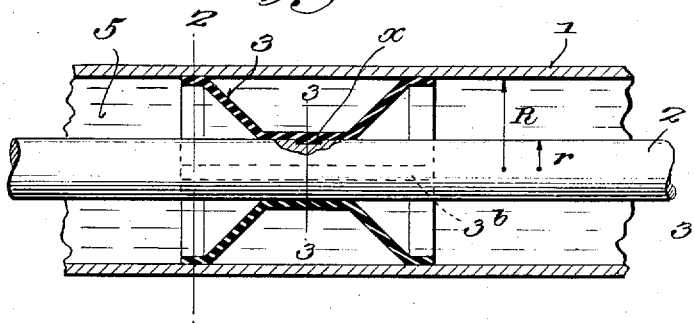
Fig. 1 is a longitudinal section of a fragment of cable embodying my invention.
Figure 2:
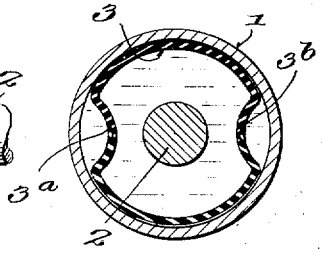
Fig. 2 is a cross-section on the line 2—2 of Fig. 1, with spacer shown therein.
Figure 3:
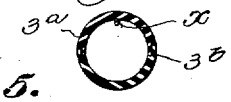
Fig. 3 is a section of the spacer on line 3—3 of Fig. 1.

Referring to the figures, first to Figs. 1, 2 and 3, (1) is the external envelope such as a pipe or casing enclosing the cable elements; (2) is the current carrying conductor or core related to the tube 1 in respect of diameters so that if $r=\frac{1}{2}''$ then $R=1\frac{1}{2}''$; and (3) is the spacer formed of molded or pressed dielectric material, such as hard rubber, mica, etc.

Figure 4:
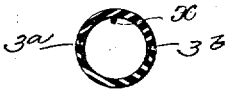
Figs. 4, 5 and 6 are corresponding figures showing a modified form of spacer.
Figure 5:
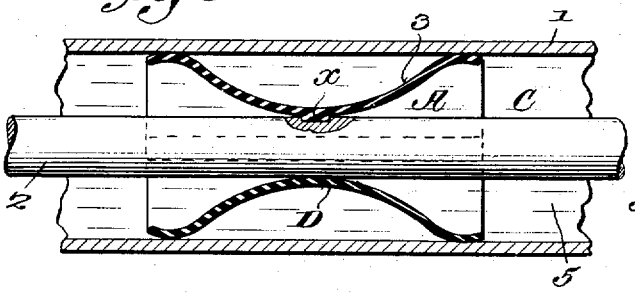
Figure 6:
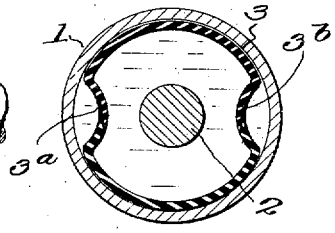

The spacer 3 is made preferably in two halves, as clearly indicated by the division lines 3a and 3b in Figs. 2, 3, 4 and 6. The tube 1 is first drawn or placed in position, and then the conductor 2 is drawn into it, the spacers 3 being applied to the conductor as it is inserted in the tube section by section. Referring to Figs. 4, 5 and 6, it will be observed that while the general arrangement is the same, the shape of the spacer is different, for reasons which will be presently explained, but the junction lines 3a and 3b are greater in extent than the thickness of the walls of the spacer as in the first form.

Figure 7:
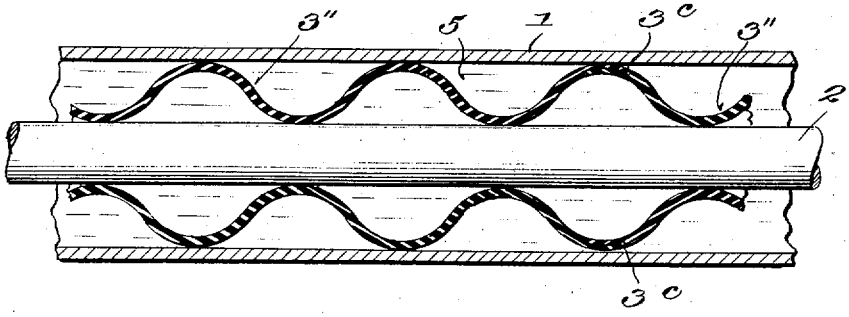
Fig. 7 is a longitudinal section showing a further modification in the form of a continuous spacer made in sections linked together.

Referring to Fig. 7, the spacer 3'' is here shown in an entirely different form, being run longitudinally of the pipe, along the conductor, in sections linked together at 3c. Any suitable linking device may be employed, provided it is simple and insures a firm joint. In Figs. 1 and 5 it will be observed that longitudinal displacement of the spacer on the conductor 2 is prevented by a barb or projection $x$ entering a depression in the conductor. These depressions may be made at regular intervals, sufficiently frequent in their recurrence to permit of variable spacing.

In both forms of cable the space 5 between the conductor 2 and the casing or pipe 1, after the conductor is drawn in, is filled at the cable end with air or gases under pressure, or with oil, as a continuous dielectric, the tube 1, of course, being sealed in any suitable manner, which I have deemed it unnecessary to illustrate.

Assuming that the round conductor is held at the center of the tube, with fixed radius R for tube, it is easily shown mathematically that when $$\frac{R}{r}=E=2.73$$

the potential gradient at surface of conductor is a minimum. This would seem to indicate that the most desirable ratio to use would be 2.7, for this value breakdown occurs without corona formation. However, some divergence from this must be made in practice. A gas surrounding a circular conductor does not go into corona until the potential gradient at a distance of $$.301\sqrt{r}$$

from surface is=to 21kv./cm.; i. e., the voltage E may be obtained from 21=

$$\frac{E}{(r+.301\sqrt{r})\log_e\frac{R}{r}}.$$

E is a maximum (for R=1½'') when $$\frac{R}{r}=3.05.$$

This is the most efficient ratio but should not be used for reasons indicated below. On any line there are numerous surges, rises in voltage, etc. These may attain value sufficient to break down cable despite designing with a fair safety factor. With 3.05 as the ratio, the breakdown would occur exactly as in a sphere gap, i. e., instantaneously, since there would be no dielectric time lag of breakdown.

To overcome this difficulty, I make $$\frac{R}{r}$$

somewhat greater than 3.05. Then corona will precede breakdown. This furnishes a means of dissipating the energy of the surge before actual failure voltages occur.

For these sizes, R=1½ and $r$=⅜, voltage may rise to approximately 1⅓ times the corona forming value before sparkover occurs. This gives a good range for dissipating surge energy.

With oil as dielectric, previous tests show that $$\frac{R}{r}$$

should be about 7 for most satisfactory results.

With the spacer 3 between the conductor 2 and the pipe 1, different conditions arise. The breakdown along the surface of the insulating material 3 is influenced by slight conducting films, etc., and so, at times, breakdown may be reduced to one half the value for an ordinary air column.

For the spacer shown in Fig. 1, the potential gradient along the surface of same at any point is $$\frac{de}{dr}\cos\theta$$

(where $$\frac{de}{dr}$$

is gradient in air, and $\theta$ is angle between tangent to spacer surface and perpendicular to conductor). To make surface of insulator as safe as air column, cos $\theta$ should be ½ or less at surface of conductor. It may increase as distance from axis increases to a point halfway between conductor and envelop. I have made cos $\theta$=¼ at the surface of the conductor and ½ for point half way between the conductor and the casing. The latter is to make the path of the flux lines in the spacer but a short part of their total path. Since the spacer will invariably have a higher dielectric constant than a gas, it is obvious that stresses at "A" will be higher than those at "C". Corona will form there at A first, but breakdown will not in general occur there because of the high strength of the solid dielectric. The amount contributed in such way will also have to be taken care of by the creepage path along the joint 3a—3b of the two halves of the spacers. The spacer design is therefore as shown. Instead of making these spacers individual, a series may be made and interlocked as shown in Fig. 7, and pulled in with the conductor, thus forming a connected system of spacing. Such type is to be used where "barrier" protection against breakdown is needed.

Some of the advantages of this design for use in say 3 phase high voltage system are: (1) Low dielectric loss. Compressed gas below corona forming voltage is practically at zero loss. Loss in the spacers is negligible. (2) High current carrying capacity due to exceptional cooling possibilities by convection currents in fluid and the fact that the spacers may be made for safe operation at a higher temperature than paper and the like. (3) High voltage possible. Limited only by the pressure which can conveniently be maintained, or by strength of oil. (4) Dielectric renewable—either gas, oil or spacers. (5) Simplicity of splicing—making possible welding or brazing of points, due to absence of paper, etc., which may be charred in ordinary types. (6) With resistance grounded neutral system, failure may occur without doing very much damage to lead pipe, conductor, etc., thus making renewal of the cable possible by replacement of the spacers. (7) Design eliminates the aging characteristics of paper and rubber cables. (8) Although air has no breakdown time lag, operating with suitable safety factor and with means of dissipating surge energy, this point may be passed by.

Losses in sheath constitute an item for consideration. In one case these may be looked upon as similar to losses in ordinary single conductor armored cable.

Sample computations (atmospheric pressure). Voltage for corona formation at "C".

$$e_c = g_o\left(1+\frac{.301}{\sqrt{r}}\right) r \log_e \frac{R}{r} \text{ (r in cm.)}$$

$$e = 21\left(1+\frac{.301}{\sqrt{.375\times 2.54}}\right).952 \log_e \frac{1.5}{.375} = 36.4 \text{ k. v.}$$

Flash over voltage=corona forming voltage for $$r=\frac{R}{3}+\text{voltage drop thru corona belt}=$$

$$21\left(1+\frac{.301}{\sqrt{5''\times 2.54}}\right).5\times 2.54 \log_e \frac{1.5}{.5}+$$

*approx.* 6.6=44 k. v.

To be very safe, it is well to compute voltage assuming that gradient at air film at "D" is 21 kv.

To allow for thermal expansion and contraction of the copper conductor, it may be made in sections with gaps or spaces between the adjacent ends of sections conductively bridged with sections of flexible jumper cable. This jumper cable may take the form of several flat, flexible conductors brazed or soldered around the periphery of the adjacent cable core ends, or it may be spring like, or of any known or other form capable of electrically connecting the adjacent ends of the cable core sections while permitting relative longitudinal movement thereof.

A system using such cable as this would obviously include certain necessary auxiliaries, such as, air compressor, filters, oil pumps and devices of that order.

Splices, ends, bends, etc., may be designed in a way similar to that of the rest of the cable.

The term "cable" is used herein for convenience and is to be construed as a term of inclusion and not of limitation, particularly as it would ordinarily connote an idea of flexibility.

I claim:

1. A cable adapted for high transmission voltages comprising in combination a core, a surrounding envelope coextensive in length with said core, a fluid dielectric medium between the core and the envelope, and a spacer element between the core and the envelope having a surface sloping from the normal to the core and with a total thickness of spacer material measured along any normal to the core but a fraction of the length of said normal through the fluid dielectric.

2. A cable adapted for high transmission voltages comprising in combination a core, a surrounding envelope coextensive in length with said core, a fluid dielectric medium between the core and the envelope, and a spacer element between the core and the envelope, said element having a surface oblique to the lines of flux emanating from the core, the degree of obliquity being such that the flashover voltage along the surface of the spacer element is equal to or greater than the flashover voltage through the fluid dielectric, said element having a thickness measured along any line of flux substantially less than the length of this line of flux in the fluid dielectric.

3. A cable adapted for high transmission voltages comprising in combination a core, a surrounding envelope coextensive in length with said core, a fluid dielectric medium between the core and the envelope, and a spacer element between the core and the envelope, said element having a surface curvature such that the cosine of the angle between any tangent to the surface of the spacer element at any given point and the perpendicular to the axis of the core at that point is equal to or less than one-half the ratio of the distance from the point to the core axis and the radius of the core and the wall of said spacer element being sufficiently attenuated to make any path of electric flux through it in length substantially less than one-half the length of the spacer element.

4. A cable adapted for high transmission voltages comprising in combination a core, a surrounding envelope coextensive with said core, a fluid dielectric medium between the core and the envelope, and a spacer element between the core and the envelope, said element having a curvature such that the cosine of the angle between any tangent to the surface of the spacer element at any given point and a perpendicular to the axis of the core at that point is approximately one-half or less for a point at the surface of the core, the value of said cosine increasing as the distance from the axis increases to a point approximately halfway between the core and the envelope and then decreasing, the wall of said spacer element being so attenuated as to thickness that for any line of electric flux the length thereof in the spacer dielectric may be but a fraction of the length in the fluid dielectric.

5. A cable adapted for high transmission voltages comprising in combination a core, a surrounding envelope coextensive in length with said core, a fluid dielectric medium between the core and the envelope and a spacer element between the core and the envelope, said envelope being a metallic tube and said spacer element having a thin wall of formed insulation extending from the core longitudinally of the cable in an expanding figure and into engagement with the envelope.

6. A cable adapted for high transmission voltages and low dielectric losses comprising in combination a core, a surrounding envelope coextensive with said core, a fluid dielectric medium between the core and the envelope, and a spacer element between the core and the envelope extended as to length and attenuated as to thickness so that for any line of electric flux the length thereof in the spacer dielectric is but a small fraction of the total length from the core to the envelope, the spacer element being formed in parts circumferentially for fitting around the core and being held against longitudinal movement by engagement with the core and held together circumferentially by the enclosing envelope.

7. A cable adapted for high transmission voltages comprising in combination a core, a surrounding envelope coextensive with said core, a fluid dielectric medium between the core and the envelope, and a spacer element between the core and the envelope of solid dielectric material having a wall of substantially uniform thickness and shaped to approximate the wall of an hour-glass with the constricted portion engaging the core and the outer extended portion engaging the envelope.

8. A cable adapted for high transmission voltages comprising in combination a core, a surrounding envelope coextensive with said core, a fluid dielectric medium between the core and the envelope, and a spacer element between the core and the envelope of solid dielectric material having a wall of substantially uniform thickness and shape to approximate the wall of an hour-glass with the constricted portion engaging the core and the outer extended portion engaging the envelope, said wall being sufficiently attenuated to make any path of electric flux through it in length but a small fraction of the length of the spacer element.

9. A cable adapted for high transmission voltages comprising in combination a core, a surrounding envelope coextensive with said core, a fluid dielectric medium between the core and the envelope, and a spacer element between the core and the envelope of solid dielectric material having a wall of substantially uniform thickness and shaped to approximate the wall of an hour-glass with the constricted portion engaging the core and the outer extended portion engaging the envelope, said wall being sufficiently attenuated to make any path of electric flux through it in length but a small fraction of the length of the spacer element, and the length and shape of the spacer element being such that any flashover along its surface occurs at a higher voltage than through the non-solid dielectric.

THOMAS F. PETERSON.